(12) United States Patent
McLean

(10) Patent No.: US 7,854,014 B2
(45) Date of Patent: Dec. 14, 2010

(54) MEDIA ENCLOSURE WITH ACCESS TO PRODUCT INFORMATION

(75) Inventor: James Gordon McLean, Fuquay-Varina, NC (US)

(73) Assignee: International Business Machines Corporation, Armonk, NY (US)

( * ) Notice: Subject to any disclaimer, the term of this patent is extended or adjusted under 35 U.S.C. 154(b) by 1026 days.

(21) Appl. No.: 11/614,170

(22) Filed: Dec. 21, 2006

(65) Prior Publication Data
US 2008/0155174 A1 Jun. 26, 2008

(51) Int. Cl.
*G06F 7/04* (2006.01)
*G06F 13/00* (2006.01)

(52) U.S. Cl. .................................. 726/30; 711/163
(58) Field of Classification Search ............. 726/26–30; 380/201; 705/57; 711/103, 161, 163; 713/193
See application file for complete search history.

(56) References Cited

U.S. PATENT DOCUMENTS

| | | | | |
|---|---|---|---|---|
| 5,153,837 A | * | 10/1992 | Shaffer et al. | 705/412 |
| 5,564,108 A | * | 10/1996 | Hunsaker et al. | 702/65 |
| 6,172,948 B1 | * | 1/2001 | Keller et al. | 369/83 |
| 6,620,094 B2 | * | 9/2003 | Miller | 600/25 |
| 6,944,632 B2 | * | 9/2005 | Stern | 707/104.1 |
| 7,272,667 B2 | * | 9/2007 | Hsu et al. | 710/14 |
| 7,584,198 B2 | * | 9/2009 | Slade | 707/101 |
| 2001/0030660 A1 | * | 10/2001 | Zainoulline | 345/720 |
| 2005/0227773 A1 | * | 10/2005 | Lu et al. | 472/60 |

* cited by examiner

*Primary Examiner*—Eleni A Shiferaw
(74) *Attorney, Agent, or Firm*—Cynthia G. Seal; Jeffrey L. Streets

(57) ABSTRACT

A method and apparatus for allowing evaluation of digital content stored on a computer readable medium without unsealing an enclosure containing the medium. The storage medium containing this first digital content is disposed within an enclosure along with non-volatile memory hardware containing second digital content preferably related to the first digital content. The enclosure is sealed to prevent access to the first digital content. However, the non-volatile memory hardware may communicate with the external device without breaking the seal on the enclosure, such as through a communication port or via wireless transmission. Accordingly, the consumer may access the second digital content as a preview of the first digital content prior to unsealing the enclosure or package.

10 Claims, 3 Drawing Sheets

MEDIA ENCLOSURE WITH ACCESS TO PRODUCT INFORMATION

BACKGROUND OF THE INVENTION

1. Field of the Invention

The present invention relates to packaging of products having digital content stored on a tangible medium.

2. Description of the Related Art

Sales of music, movies, software and other media products represent a market of significant size worldwide. Consumers purchase a variety of digital products stored on media such as compact disks (CDs), digital video disks (DVDs), audio and video tapes, etc. Due to the ease of reproduction and industry concerns about piracy, most media products may not be returned once opened. Currently the tamper-resistant enclosures in which these products are sold have various means for determining whether they have been opened, and therefore not returnable for credit or refund.

As the capacity of affordable storage media increases, larger volumes of content may be stored on a single medium. The possibility exists to package significant amounts of content, such as the entire recordings of a musical artist, a collection of several movies, or complex software products and bundles. These products may entail a significantly higher cost to the consumer than current offerings, such as a single album CD, or a single DVD movie. This higher cost means that the consumer is more likely to spend time evaluating the product before purchasing. Unfortunately, the higher cost may also entice some individuals to steal the content.

Currently, several inefficient methods for evaluating these products exist. For example, a consumer may listen to introductory pieces of songs on an album at a kiosk. The consumer may rent a movie to view prior to purchasing a copy of the very same movie. Furthermore, the consumer may be able to download a "stripped down" version of a software product in order to evaluate it prior to purchasing. These options often dictate the manner and method of evaluation, as well as require the consumer to set aside time during business hours for the task of product evaluation.

The methods available for consumers to evaluate products are very diverse in nature, and are often inadequate for a thorough evaluation. As the amount of content that is packaged increases, and consequently the price increases, the need for a means of exhaustive evaluation by the consumer will grow. From the vendor's standpoint, it will be even more important to ensure that content is not pirated or copied and returned for credit, therefore allowing returns after the product is opened is not a viable option.

A method or apparatus that allows comprehensive evaluation of the product may enhance the value of the product, result in greater sales volume, and higher customer satisfaction levels. It would be desirable, therefore to be able to access product content or other information for the purpose of product evaluation without breaching the original packaging, so that the product may be evaluated. It would be further desirable if the consumer could evaluate the product content either in the store prior to purchase or at their home or business after the purchase but while the product is still in a condition suitable to be returned to the store for credit.

SUMMARY OF THE INVENTION

The present invention addresses the above need by providing a method for allowing evaluation of digital content without unsealing the packaging. First digital content is stored on a storage medium that is then disposed within a sealed enclosure. Non-volatile memory hardware containing second digital content is also disposed within the sealed enclosure and may communicate the second digital content with an external device without breaking the seal on the enclosure.

The non-volatile memory hardware contains digital content that provides information about the digital content on the storage medium. The non-volatile memory hardware communicates with the external device under various limitations, such as a configurable period of time, amount of data stored or transferred, or number of communications. The non-volatile memory hardware may then be recovered for reuse, or sold as a secondary product within the sealed enclosure.

DETAILED DESCRIPTION

Figure 1:
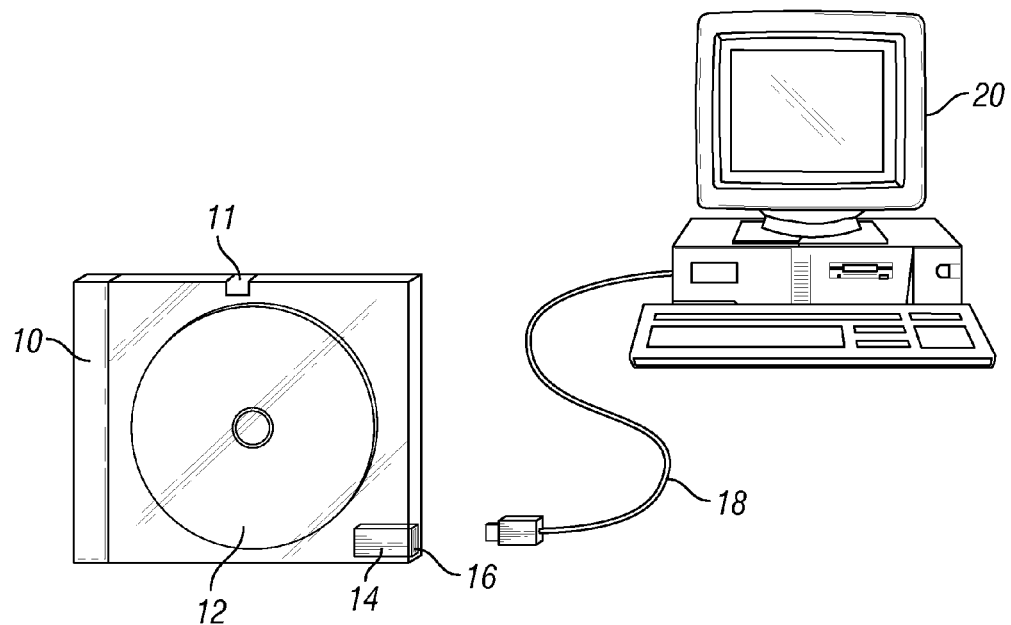
FIG. 1 is a schematic representation of a sealed enclosure containing digital storage media and non-volatile memory hardware.

The present invention provides a sealed enclosure or packaging that contains a computer readable storage medium storing first digital content and non-volatile memory hardware storing second digital content. The storage medium and hardware cannot be removed with unsealing the enclosure. However, the non-volatile memory hardware can communicate with an external device, such as through a port or wireless transmission. Preferably, the second digital content is related to the first digital content in a manner that enables a consumer to access the second digital content as a "preview" of the first digital content. Accordingly, the second digital content may be limited, relative to the first digital content, in one or more characteristics, such as duration of accessibility, extent of the content, number of access sessions, availability of certain features, and combinations thereof.

The first digital content is stored on a storage medium. This content may be audio content, video content, software content, or any combination thereof. The most typical examples of such content may be recordings of musical artists, movies, or software application programs. The storage medium may be any medium typically used for this purpose, such as compact disks (CDs), digital video disks (DVDs), cassette tapes, wire recordings, photographic film, etc. The storage medium is designed to be readable by a device. In the example of a CD, the device may be an audio player, a video player, a computer, etc. Most typically, the digital content stored on the storage medium may be a product that the manufacturer wishes to sell.

The second digital content is then stored on a non-volatile memory hardware. Non-volatile memory hardware is hardware that can store information even when there is no power being supplied. Common examples of non-volatile memory hardware are read only memory (ROM), flash memory, and computer hard disk drives.

The second digital content stored on the non-volatile memory hardware is preferably selected to inform the potential purchaser of the first digital content, or complementary products. For example, if the first digital content is a music album, the second digital content may be 20 second clips of each song, or a listing of other albums by the same artist. The second digital content need not be of the same form or format of the first digital content. The non-volatile memory hardware may contain a portion of the digital content stored on the storage medium, documents containing advertising or product information, instructions on how to obtain information via the Internet, contain a login name and password, or give directions to a file transfer protocol (FTP) site.

Both the storage medium and the non-volatile memory hardware are disposed within a sealed enclosure. Communication between the non-volatile memory hardware and an external device is enabled without opening the sealed enclosure. For example CD jewel cases often have a small silver seal which must be broken in order to open the case. In this instance, the CD jewel case may have an opening or port in which a cable could be coupled to the non-volatile memory hardware. In this manner, an external device could communicate with the non-volatile memory hardware without the seal being broken, or the CD jewel case being opened.

The external device communicating with the non-volatile memory hardware need not be the same device that the storage medium is intended for. The external device may be any device which can access information in the format stored on the non-volatile memory hardware. The most typical external device utilized may be a computer. For example, the storage medium may be a CD, intended to be used with an audio player. However, the non-volatile memory hardware may be a flash memory drive, intended for use with a computer.

The non-volatile memory hardware may receive power from a small battery within the sealed enclosure, a battery outside the sealed enclosure, by plugging it into an electrical outlet, or from the device with which it is communicating. The preferred method is for the non-volatile memory hardware to receive power from the device with which it is communicating. A typical example of this is a universal serial bus (USB) drive. When plugged into a computer, the USB drive receives power for communication through the connection itself.

The non-volatile memory hardware may contain several formats of information for communication with various external devices. For example, it may contain audio streams for playback on a portable multimedia player, video content for viewing on a television or computer screen, sample programs or screenshots of program content, text documents for printing or viewing on a computer, or any other applicable information.

The non-volatile memory hardware may also have a means of identifying the type of external device that it is communicating with, and whether it has communicated with the particular external device in the past. The non-volatile memory hardware may further be configured to communicate with a specific external device for a configurable period of time, a configurable amount of data transferred, a configurable number of communications, or any other limitation. By controlling the type and length of communication between the non-volatile memory hardware and an external device, the type, duration, and extent of the evaluation content provided to the user may be controlled and limited if desired. Also, the type of data communicated by the non-volatile memory hardware may be selected once the type of external device is identified. Once the non-volatile memory hardware determines what it is communicating with, the proper format of content may be presented to the external device. Alternatively, the external device may be able to identify a compatible file type on the non-volatile memory hardware and access only that file type, rather than all the stored content. This allows multiple units of non-volatile memory hardware having the same second digital content to communicate with one or more different types of external devices upon demand.

Upon purchase of the digital content on the storage medium, the non-volatile memory hardware may be recovered for reuse. The recovery may be accomplished by offering a credit or other incentive to the consumer for returning the hardware. Alternatively, the non-volatile memory hardware may be kept by the consumer as a secondary product for personal reuse. This is particularly suitable, for example, if the non-volatile memory hardware takes the form of a USB drive. If recovered for reuse, the non-volatile memory hardware need not be utilized for the same product. The non-volatile memory hardware may be reprogrammed with content for other products, or information about other digital content.

FIG. 1 is a schematic representation of an enclosure 10 containing a digital storage medium 12 and non-volatile memory hardware. The digital content may be any content typically stored on a medium, such as audio content, video content, or software content. The storage medium may be any medium typically read by a device, such as a CD, or DVD. The enclosure 10 may incorporate a seal 11, which prevents the unintentional opening of the enclosure 10. The seal 11 may be of any type to indicate that the enclosure 10 has been opened. Many CD jewel cases utilize a small silver piece of adhesive which may not be removed and re-attached. By removing this seal 11, it is evident that the enclosure has been opened. Other methods of sealing such as shrink wrapping, may be utilized alone or in various combinations.

An access port 16 is provided on the enclosure. The access port may be of any type to allow an external device 20 to communicate with a non-volatile memory hardware 14. Some examples of this port may be a USB port, an IEEE-1394 (Firewire) port, an infrared port, or a wireless port.

Non-volatile memory hardware 14 is located within the enclosure 10, and may be accessed through the access port 16. A typical example of non-volatile memory hardware is a flash memory drive. The connection between the non-volatile memory hardware 14 and a separate device 20 may be a cable 18, a wireless connection, or any commonly used connection means.

The access port 16 may be utilized without breaking the seal 11. It should be evident that, while the non-volatile memory hardware 14 may be accessed through the access port 16, the storage medium 12 may not be removed or otherwise accessed without breaking the seal 11.

The external device 20 retrieves information from the piece of non-volatile memory hardware. The device may be anything capable of communicating with the non-volatile memory hardware, such as a television, personal computer, mp3 player, video camera, mobile phone, personal digital assistant, etc.

Figure 2A:
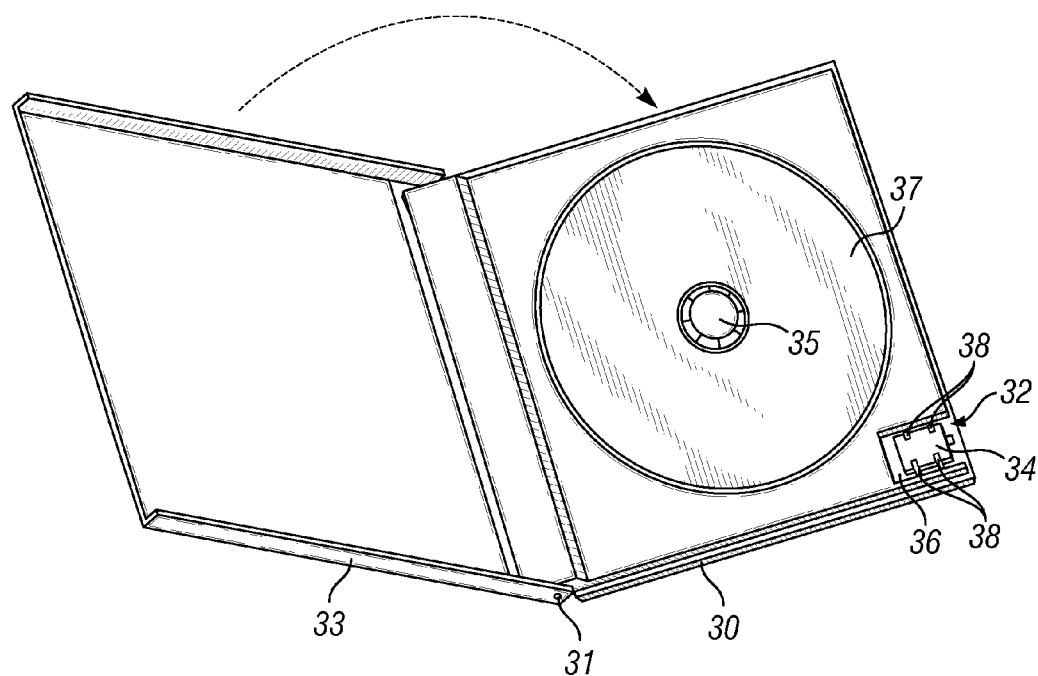
FIGS. 2A, 2B are perspective views of a jewel case implementing one embodiment of the present invention.
Figure 2B:
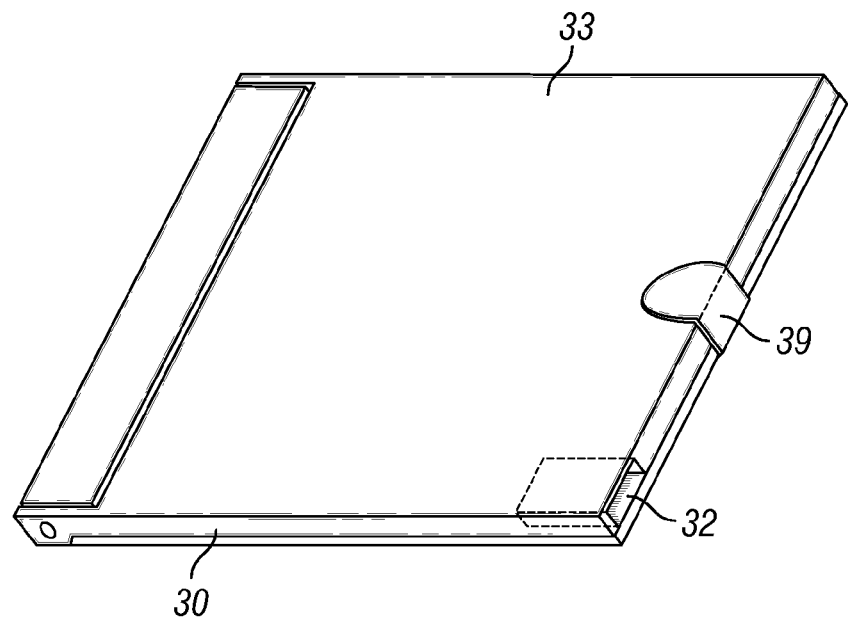

FIGS. 2A and 2B are perspective views of a media case implementing one embodiment of the present invention. In FIG. 2A, the media case 30 has an indentation 37 for receiving and securing an optical disk. The disk may be a compact disk (CD), digital video disk (DVD), or any other storage medium that would fit. There is a latch 35 to hold the storage medium in place. A top 33 to the media case 30 has a hinge 31 that allows the case to open and close to provide access to the storage medium. The media case 30 also has a slot 32, to enable an external device to communicate with, or electronically access, the non-volatile memory hardware 34 without opening the case 30. A typical example of non-volatile memory hardware 34 is a flash memory drive having a USB connector port. The non-volatile memory hardware 34 sits in an indentation 36 to hold the non-volatile memory hardware 34 in place. There may also be clips 38 to hold the non-volatile memory hardware 34 in place.

FIG. 2B shows the media case 30 with the top 33 closed. The case may incorporate or be used in conjunction with a seal 39. The slot 32 allows electronic access to, or other mode of communication with, the non-volatile memory hardware (not shown) without removing the seal 39. The non-volatile memory hardware (not shown) may be accessed without gaining access to the other contents of the media case 30.

Figure 3:
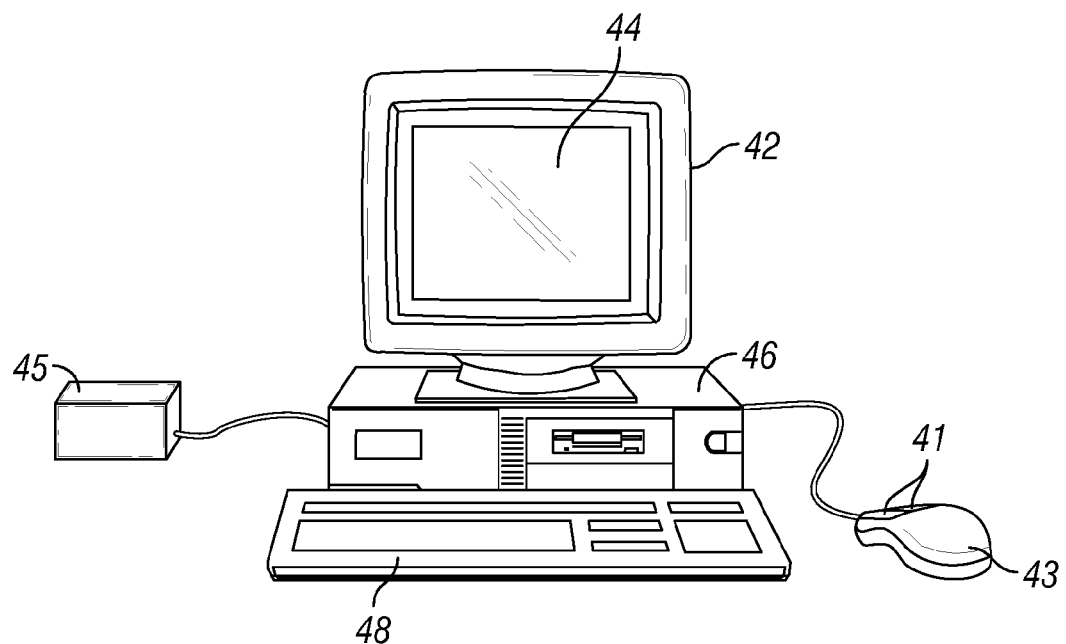
FIG. 3 is a computer system having various typical input and output devices.

FIG. 3 is a computer system having various typical input and output devices. The computer system 40 includes a display device 42 (such as a monitor), a display screen 44, a cabinet 46 (which encloses components typically found in a computer, such as CPU, RAM, ROM, video card, hard drive, sound card, serial ports, etc.), a keyboard 48, a mouse 43 and a modem 45. The mouse 43 may have one or more buttons, such as buttons 41. The computer requires some type of communication device such as modem 45 that allows computer system 40 to be connected to the Internet. Other possible communication devices include Ethernet network cards, or wireless network cards. A computer may be used to access the information stored on the non-volatile memory hardware, as described in FIG. 1.

The described example shown in FIG. 3 does not imply architectural limitations. For example, those skilled in the art will appreciate that the present invention may be implemented in other computer system configurations, including hand-held devices, multiprocessor systems, microprocessor based or programmable consumer electronics, network personal computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Figure 4:
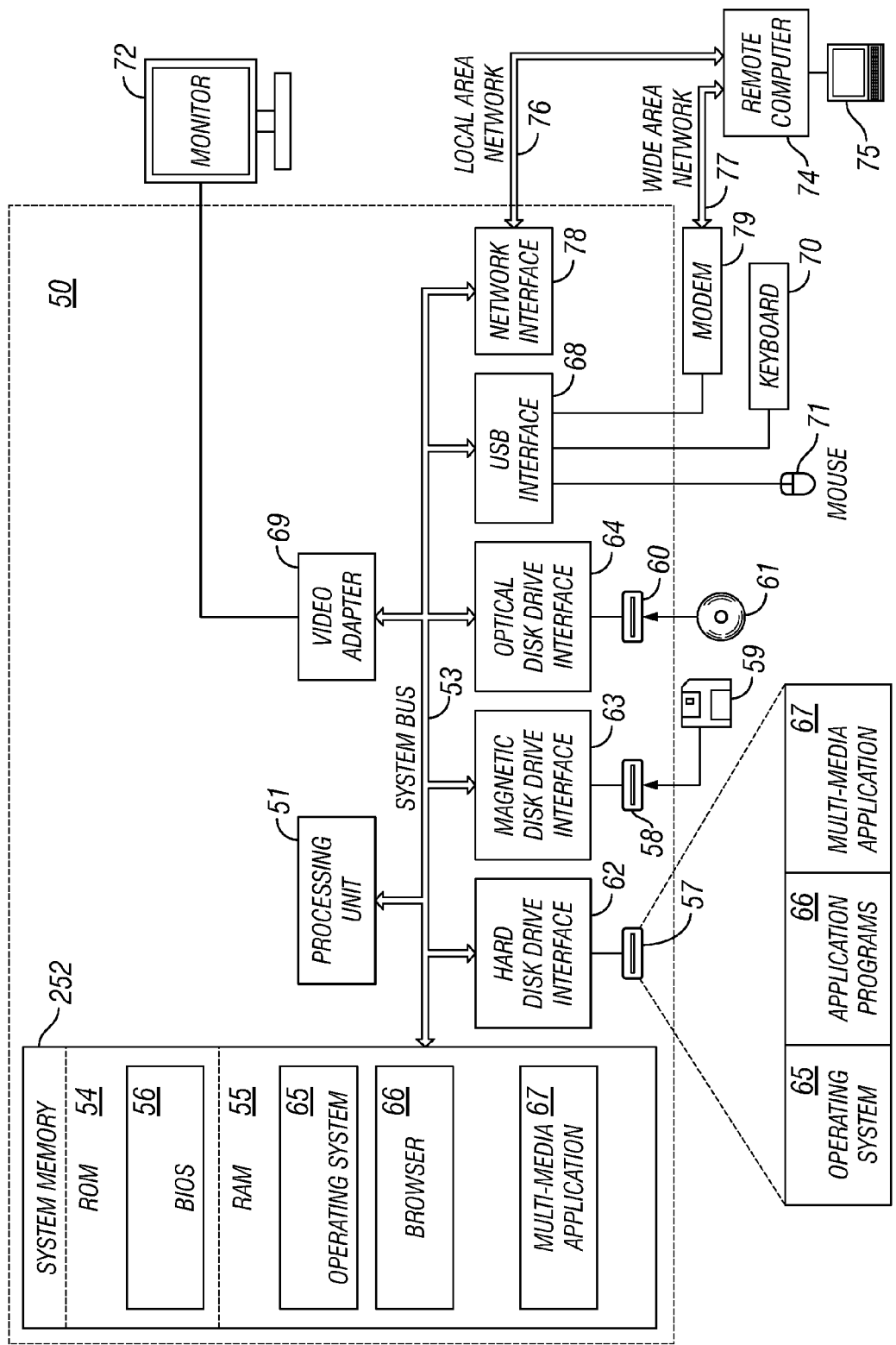
FIG. 4 is a schematic diagram of a computer system having a browser and network access.

FIG. 4 is a schematic diagram of a computer system 50 that is capable of communicating with the non-volatile memory hardware 34 within the case 30 (See FIGS. 1, 2A, and 2B). The system 50 may be a general-purpose computing device in the form of a conventional personal computer 50. Generally, a personal computer 50 includes a processing unit 51, a system memory 52, and a system bus 53 that couples various system components including the system memory 52 to processing unit 51. System bus 53 may be any of several types of bus structures including a memory bus or memory controller, a peripheral bus, and a local bus using any of a variety of bus architectures. The system memory includes a read-only memory (ROM) 54 and random-access memory (RAM) 55. A basic input/output system (BIOS) 56, containing the basic routines that help to transfer information between elements within personal computer 50, such as during start-up, is stored in ROM 54.

Computer 50 further includes a hard disk drive 57 for reading from and writing to a hard disk 57, a magnetic disk drive 58 for reading from or writing to a removable magnetic disk 59, and an optical disk drive 60 for reading from or writing to a removable optical disk 61 such as a CD-ROM or other optical media. Hard disk drive 57, magnetic disk drive 58, and optical disk drive 60 are connected to system bus 53 by a hard disk drive interface 62, a magnetic disk drive interface 63, and an optical disk drive interface 64, respectively. Although the exemplary environment described herein employs hard disk 57, removable magnetic disk 59, and removable optical disk 61, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for computer 50. For example, the operating system 65 and application programs, such as a Web browser 66 or multimedia application 67, may be stored in the RAM 55 and/or hard disk 57 of the computer 50.

A user may enter commands and information into personal computer 50 through input devices, such as a keyboard 70 and a pointing device, such as a mouse 71. Other input devices (not shown) may include a microphone, joystick, game pad, satellite dish, scanner, or the like. These and other input devices are often connected to processing unit 51 through a serial port interface 68 that is coupled to the system bus 53, but input devices may be connected by other interfaces, such as a parallel port, game port, a universal serial bus (USB), or the like. A display device 72 may also be connected to system bus 53 via an interface, such as a video adapter 69. In addition to the monitor, personal computers typically include other peripheral output devices (not shown), such as speakers and printers.

The computer 50 may operate in a networked environment using logical connections to one or more remote computers 74. Remote computer 74 may be another personal computer, a server, a client, a router, a network PC, a peer device, a mainframe, a personal digital assistant, an Internet-connected mobile telephone or other common network node. While a remote computer 74 typically includes many or all of the elements described above relative to the computer 50, only a memory storage device 75 has been illustrated in the figure. The logical connections depicted in the figure include a local area network (LAN) 76 and a wide area network (WAN) 77. Such networking environments are commonplace in offices, enterprise-wide computer networks, intranets, and the Internet.

When used in a LAN networking environment, the computer 50 is often connected to the local area network 76 through a network interface or adapter 78. When used in a WAN networking environment, the computer 50 typically includes a modem 79 or other means for establishing high-speed communications over WAN 77, such as the Internet. A modem 79, which may be internal or external, is connected to system bus 53 via serial port interface 68. In a networked environment, program modules depicted relative to personal computer 50, or portions thereof, may be stored in the remote memory storage device 75. It will be appreciated that the network connections shown are exemplary and other means of establishing a communications link between the computers may be used. A number of program modules may be stored on hard disk 57, magnetic disk 59, optical disk 61, ROM 54, or RAM 55, including an operating system 65, browser 66, and multimedia application 67. The multimedia application 67 may be a video and audio player, such as the Microsoft Windows Media Player. The multimedia application 67 may also be a word processing program, such as Microsoft Word, a presentation program, such as Microsoft PowerPoint, a picture viewer, such as Microsoft Windows Picture and Fax Viewer, or any other program that may display content to a user.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of allowing controlled access to product content or information comprising:
   storing first digital content on an optical disk;
   storing second digital content on a non-volatile memory hardware;
   disposing the optical disk and the non-volatile memory hardware within a sealed enclosure;
   preventing physical access to, or communication with, the optical disk without opening the sealed enclosure; and
   enabling communication of the second digital content from the non-volatile memory hardware to an external device capable of reading the second digital content without opening the sealed enclosure;
   wherein the non-volatile memory hardware is a flash memory drive;
   accessing the flash memory drive via a USB port in the side of the sealed enclosure; and
   clipping the flash memory drive in place within the sealed enclosure.

2. The method of claim 1, wherein the first digital content is an audio product, a video product, a software product, or any combination thereof.

3. The method of claim 1, further comprising:
   accessing the non-volatile memory hardware via a commonly used communication connection selected from the following group: USB, IEEE-1394 (FireWire), a COM connection, Infrared, Wireless, any registered jack (RJ-XX), an RCA jack, an optical fiber, an Ethernet port, an Ethernet cable, or a phone jack.

4. The method of claim 1, wherein product information or product content on the non-volatile memory hardware is streamed to the external device.

5. The method of claim 1, wherein the non-volatile memory hardware stores information selected from the group consisting of a website address, a login name, a password, instructions for accessing product content or product information on the internet, a file transfer protocol (FTP) address, instructions for downloading product content or product information, product presentations, product documentation, advertising materials, a portion of the product content, and combinations thereof.

6. The method of claim 1, wherein the non-volatile memory hardware receives power only from a connection to the external device with which the non-volatile memory hardware is communicating.

7. The method of claim 1, further comprising:
   recovering the non-volatile memory hardware after the sealed enclosure has been opened.

8. The method of claim 7, further comprising:
   reprogramming and reusing the non-volatile memory hardware in other sealed enclosures.

9. The method of claim 1, further comprising the non-volatile memory hardware:
   identifying the external device communicating with the non-volatile memory hardware;
   maintaining a record of the external devices that have communicated with the non-volatile memory hardware;
   communicating with the external device for a configurable period of time, a configurable amount of data transferred, or configurable number of communications after the initial access; and
   retaining information stored on the non-volatile memory hardware for communication with a new external device, wherein the new external device has not previously communicated with the non-volatile memory hardware.

10. The method of claim 9, further comprising:
    storing various formats of content on the non-volatile memory hardware, wherein different formats may be accessed by different types of external devices; and
    presenting the properly formatted content based upon the type of external device identified by the non-volatile memory hardware.

* * * * *